(12) United States Patent
Yoshinaga et al.

(10) Patent No.: US 12,420,494 B2
(45) Date of Patent: Sep. 23, 2025

(54) THERMAL CAULKING JOINED BODY

(71) Applicant: HITACHI ASTEMO, LTD., Hitachinaka (JP)

(72) Inventors: Kumiko Yoshinaga, Hitachinaka (JP); Satoshi Uchida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 783 days.

(21) Appl. No.: 17/640,799

(22) PCT Filed: Nov. 18, 2020

(86) PCT No.: PCT/JP2020/042880
§ 371 (c)(1),
(2) Date: Mar. 4, 2022

(87) PCT Pub. No.: WO2021/100725
PCT Pub. Date: May 27, 2021

(65) Prior Publication Data
US 2022/0332056 A1    Oct. 20, 2022

(30) Foreign Application Priority Data

Nov. 18, 2019   (JP) ................................. 2019-207606

(51) Int. Cl.
*B29C 65/00* (2006.01)
*B29C 65/20* (2006.01)
*B29L 31/34* (2006.01)

(52) U.S. Cl.
CPC ........ *B29C 66/30321* (2013.01); *B29C 65/20* (2013.01); *B29L 2031/3481* (2013.01)

(58) Field of Classification Search
CPC ............... B29C 66/30321; B29C 65/20; B29L 2031/3481
See application file for complete search history.

(56) References Cited

FOREIGN PATENT DOCUMENTS

JP        2011-167900 A     9/2011

OTHER PUBLICATIONS

Kazuki, Mukoyama, "JP2018135909A—Translation," 2018, JPO, pp. 1-21 (Year: 2018).*
International Preliminary Report on Patentability dated May 17, 2022 issued in International Application No. PCT/JP2020/042880, with English translation, 10 pages.
International Search Report dated Jan. 12, 2021 issued in International Application No. PCT/JP2020/042880, with English translation, 5 pages.

* cited by examiner

*Primary Examiner* — Maria V Ewald
*Assistant Examiner* — Ethan Weydemeyer
(74) *Attorney, Agent, or Firm* — FOLEY & LARDNER LLP

(57) ABSTRACT

A caulking pin (15) is inserted into a mounting hole (21) provided in a metal case body (3), and the end portion of the caulking pin (15) is thermally caulked with a welding tip (24) to form a mold forming portion (17). A surplus absorption recess (31) is formed by enlarging the opening end of the mounting hole (21), and surplus resin is absorbed. The surplus absorption recess (31) is positioned inside a region of the mold forming portion (17). Therefore, the amount of molten surplus resin that protrudes outward from the welding tip (24) in the thermal caulking process is reduced.

7 Claims, 14 Drawing Sheets

THERMAL CAULKING JOINED BODY

TECHNICAL FIELD

The present invention relates to a thermal caulking joined body formed by the joining of thermal caulking, as, for example, a casing for an electronic device.

BACKGROUND TECHNOLOGY

For example, in a casing for an electronic device which is formed by combining a metal case body and a synthetic resin cover, instead of joining by screws, joining by thermal caulking is sometimes adopted. The thermal caulking is a method in which a synthetic resin caulking pin is inserted through a mounting hole, and then the end portion of the caulking pin is heated and pressed so as to form a thermal caulking portion wider than the mounting hole. The formation of the thermal caulking portion is carried out by using an electric heating type welding tip (hereinafter is simply referred to as "welding tip") in which a forming mold surface having a cup shape corresponding to a desired shape of thermal caulking is recessed on the distal end surface thereof.

In such thermal caulking, when the distal end portion of the caulking pin is heated and pressed by the welding tip so as to plasticize resin material, if the amount of the resin material is insufficient for the volume of the forming mold surface having a cup shape, part of a thermal caulking portion is not formed, and a predetermined joining strength cannot be obtained. Therefore, in general, the relationship between the size of the distal end part of the calking pin which passes through the mounting hole and protrudes from the mounting hole and the volume of the forming mold surface is designed such that surplus resin material is slightly formed.

Therefore, there is a problem that when the thermal caulking is carried out, surplus resin material protrudes outward from the distal end surface of the welding tip, and it becomes so-called burrs. The burrs sometimes adhere onto the distal end surface of the welding tip, as a result of which work in which caulking process is stopped to clean the distal end of the welding tip by handwork becomes necessary. In particular, in case where a temperature sensor (thermocouple) is provided to the distal end portion of the welding tip, a problem such as the disconnection of the temperature sensor at the time of the cleaning of the welding tip arises.

In a patent document 1, a technique has been disclosed that in order to avoid the entering of the burrs, which are formed due to the surplus resin material which is formed at the time of the thermal caulking, into an apparatus caused by the separation of the burrs from the thermal caulking portion, a small hole or a notch is formed at the periphery of the mounting hole so as to partially expose from the outer periphery of the welding tip, such that the surplus resin material overflows to the outside of the welding tip through the small hole or the notch.

However, in the technique of the patent document 1, part of molten resin material overflowing to the outside of the welding tip through the small hole or the notch adheres onto the distal end of the welding tip and solidified. Therefore, the problem of the stain of the welding tip due to the surplus resin material cannot be sufficiently solved.

PRIOR ART REFERENCE

Patent Document

Patent Document 1: Japanese Patent Application Publication 2011-167900

SUMMARY OF THE INVENTION

In one aspect of the present invention, in a thermal caulking joined body by joining members to each other in a manner that the end portion of a caulking pin passing through a mounting hole is molded to be a thermal caulking portion wider than the mounting hole, a surplus absorption recess into which molten surplus resin flows is provided in a caulking receiving surface on and with which the thermal caulking portion is spread and comes in contact, and is positioned inside a mold forming region of the thermal calking portion.

According to the present invention, the surplus resin material flows into the surplus absorption recess positioned inside a region covered with the thermal caulking portion, and consequently, the amount of the resin material, as burrs, protruding outward from the thermal caulking portion is reduced. Therefore, at the time of a thermal caulking process, the stain of the welding tip decreases.

MODE FOR IMPLEMENTING THE INVENTION

In the following, one embodiment in which the present invention is applied to a casing of an electronic device for a vehicle will be explained in detail based on the drawings.

Figure 1:
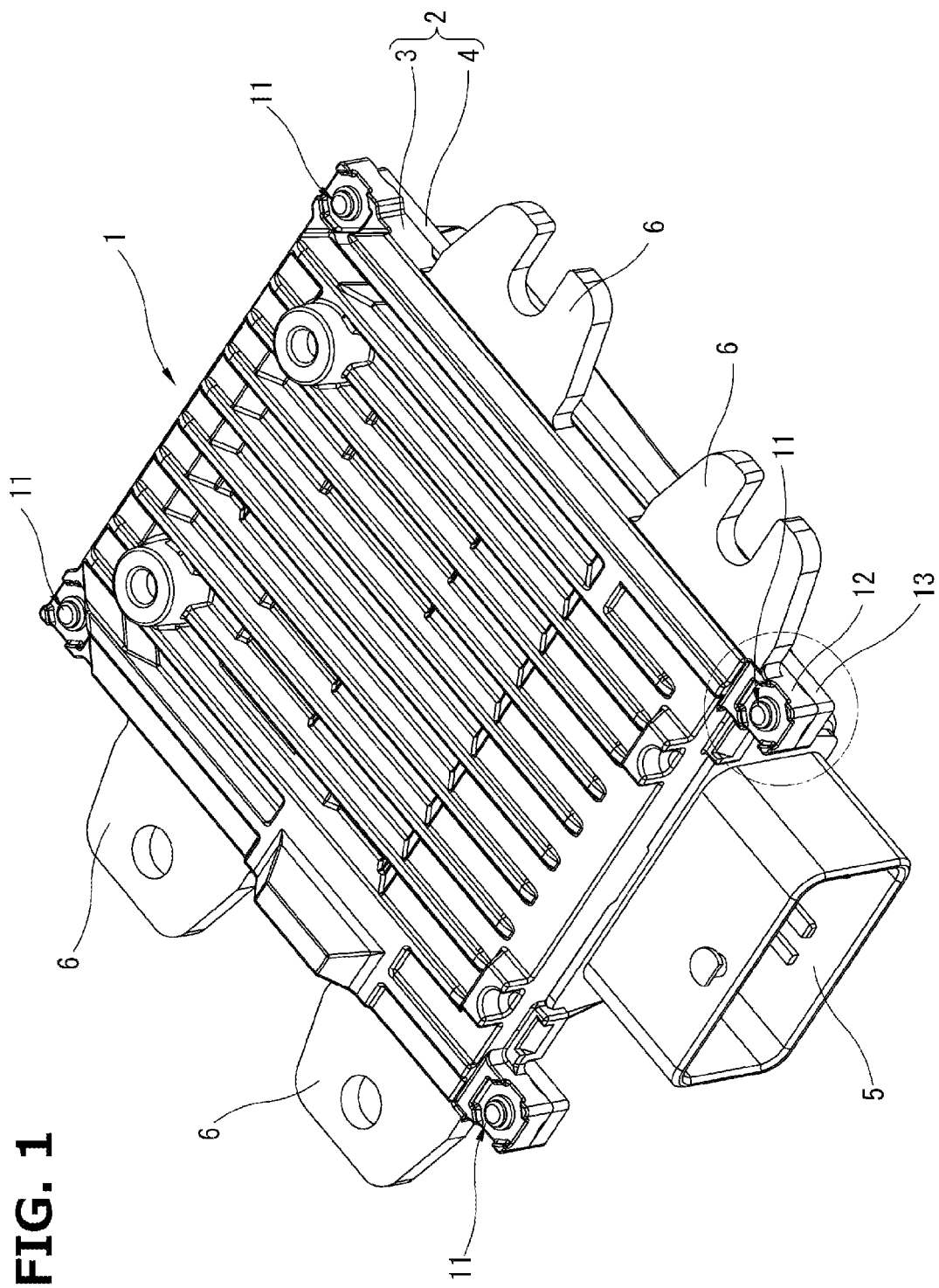
FIG. 1 is a perspective view showing a casing formed by being joined with thermal caulking as one embodiment of the present invention.

FIG. 1 is a perspective view of an electronic device 1 that is one embodiment of the present invention. The electronic device 1 is one attached at a appropriate position of a vehicle as, for example, a controller for an automatic transmission for a vehicle, and is provided with a casing 2 and a circuit substrate not shown which is accommodated inside the casing 2. The casing 2 is composed of a plate-shaped metal case body 3 having a substantially rectangular shape and a synthetic resin cover 4 having a swelling shape so as to cover one surface (surface on the lower side of FIG. 1) of the case body 3. In addition, a connector 5 attached to one end of the circuit substrate not shown is held between the case body 3 and the cover 4. The case body 3 is provided with, at four places thereof, tongue-like bracket parts 6 for the attachment to a vehicle body.

Figure 2:
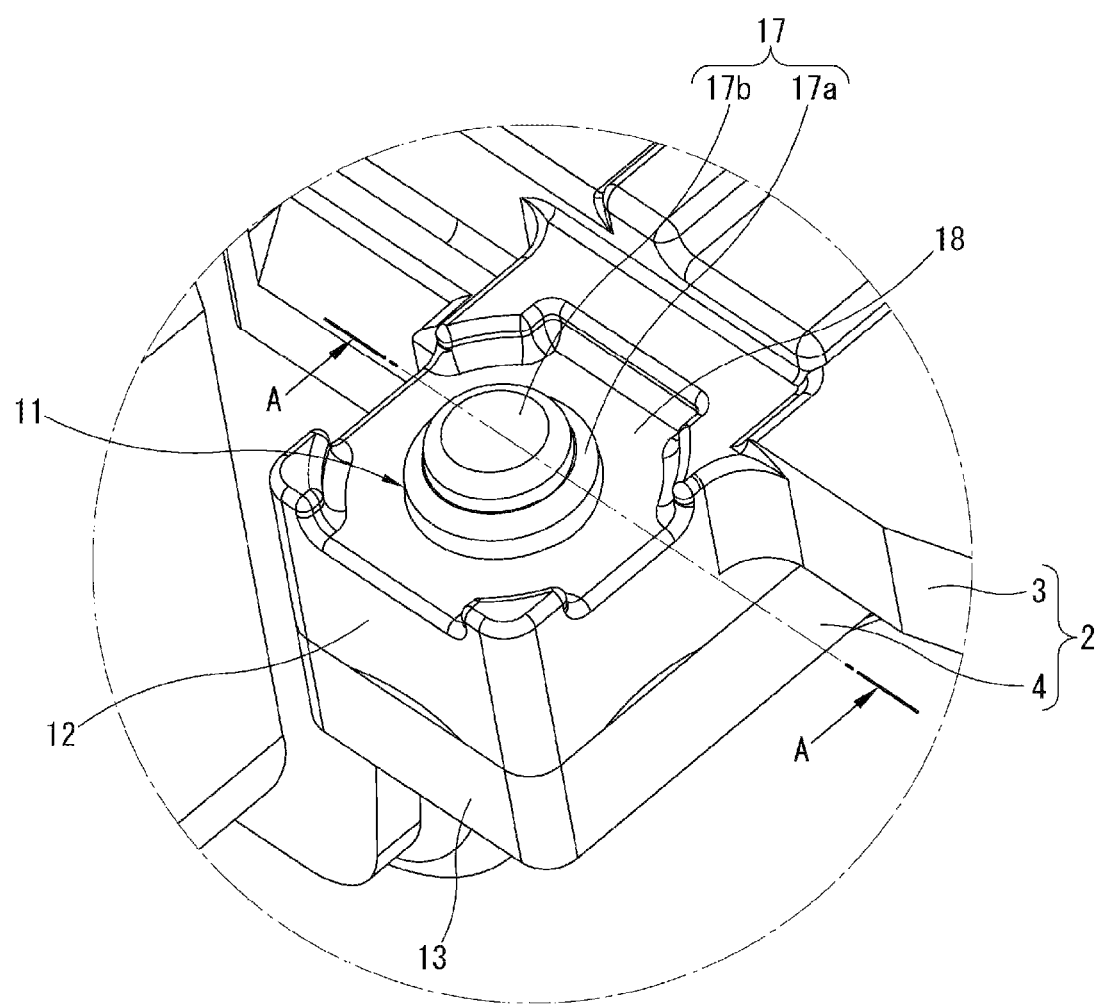
FIG. 2 is a perspective view showing an enlarged main part of the casing.

The case body 3 and the cover 4 are joined to each other by total four thermal caulking portions 11 provided at respective four corners of the casing 2, so as to form the sealed casing 2. FIG. 2 shows an enlarged one of the thermal caulking portions 11. As shown in FIG. 2, the case body 3 and the cover 4 are respectively provided with rectangular tabs 12, 13 having substantially square outer shapes corresponding to each other so as to extend outward along one plane that becomes a joined surface of them, and these rectangular tabs 12, 13 are joined to each other by a thermal caulking portion 11.

The thermal caulking portion 11 is one in which, as mentioned below, the distal end portion of a calking pin 15 (see FIG. 4 and FIG. 9) provided to the rectangular tab 13 that is part of the synthetic resin cover 4 is crashed while heating and softening it so as to form a disk-like mold forming portion 17, and the peripheral edge part of the mold forming portion 17 radially extending comes in contact with a flat caulking receiving surface 18 of the rectangular tab 12 on the case body 3 side. Consequently, the case body 3 and the cover 4 are firmly joined to each other. In the illustrated example, the mold forming portion 17 has a two-step shape having a circular large diameter portion 17a which comes in contact with the caulking receiving surface 18 and a circular small diameter portion 17b superimposed on the large diameter portion 17a.

Figure 3:
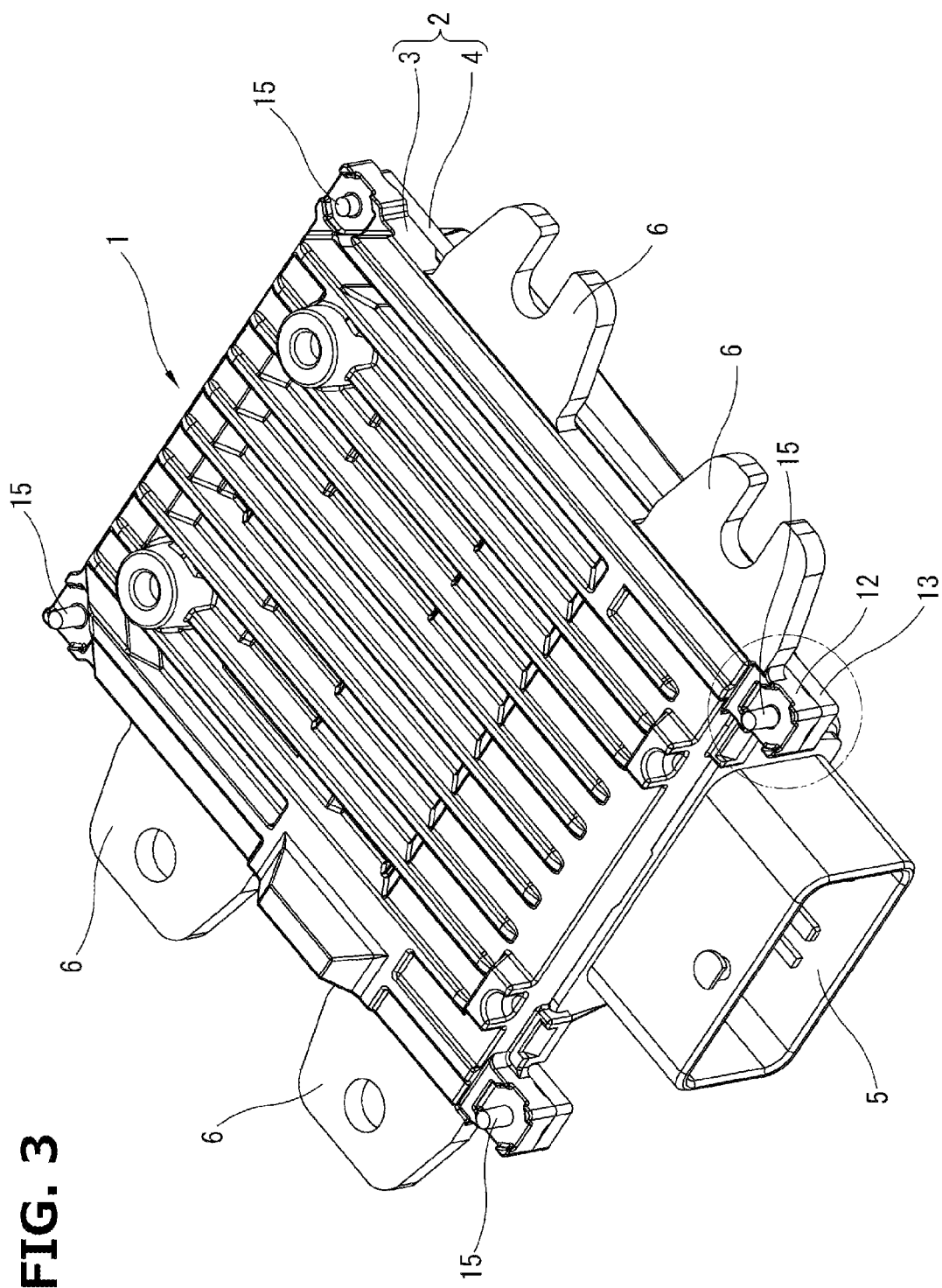
FIG. 3 is a perspective view showing the casing before carrying out a thermal caulking process.
Figure 4:
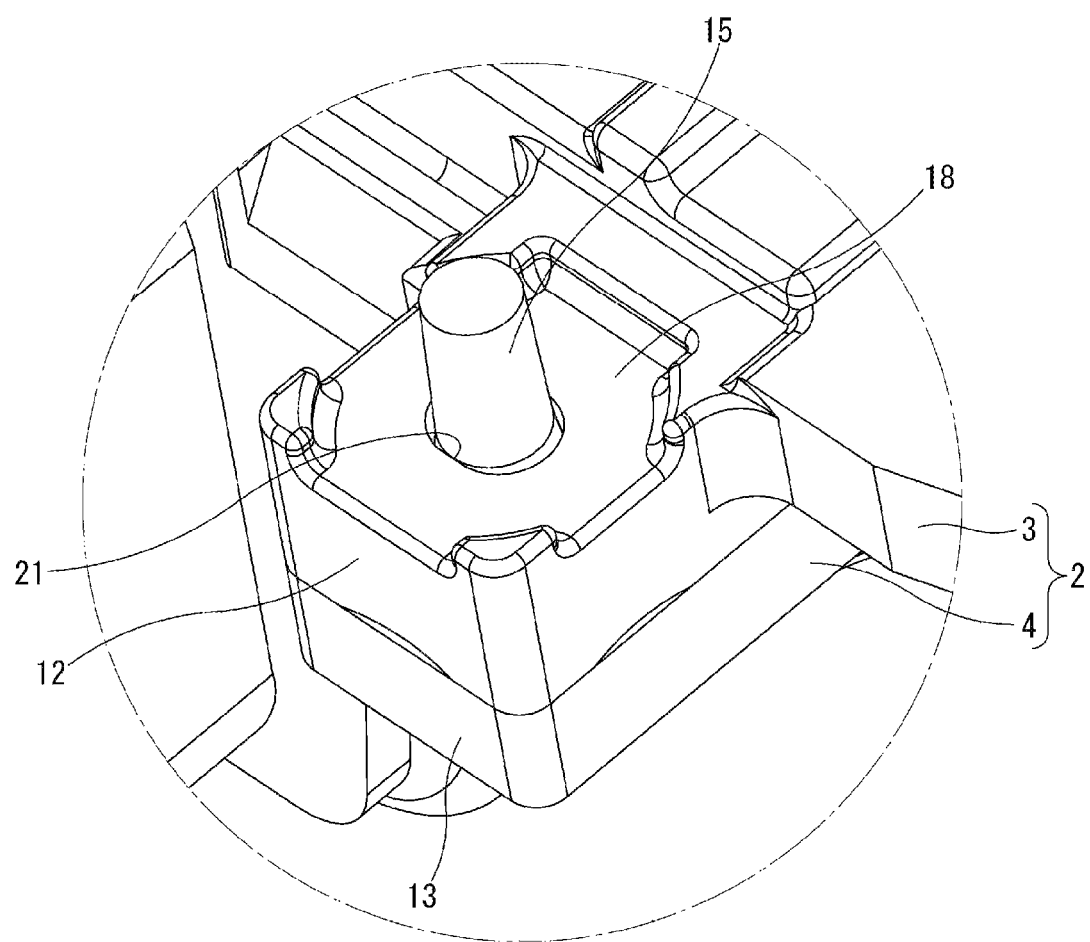
FIG. 4 is a perspective view showing an enlarged main part of the casing.

FIG. 3 shows a casing 2 formed by combining a case body 3 and a cover 4 before carrying out a thermal caulking process, and FIG. 4 shows a state before the thermal caulking process is carried out to rectangular tabs 12, 13 as a main part. As shown in FIG. 4, the cover 4 has a caulking pin 15 having a truncated conical shape, and a circular mounting hole 21 into which the caulking pin 15 is inserted is formed in the case body 3 by penetrating therethrough. The mounting hole 21 is formed to be a taper-shaped hole such that the diameter thereof becomes large on the surface joined to the cover 4 so as to easily insert the caulking pin 15. In one example, the taper angle of the outer peripheral surface of the caulking pin 15 is equal to the taper angle of the inner peripheral surface of the mounting hole 21. In a state before carrying out the thermal caulking process, the distal end portion of the caulking pin 15 passing through the mounting hole 21 protrudes by a predetermined amount from the caulking receiving surface 18.

Figure 5:
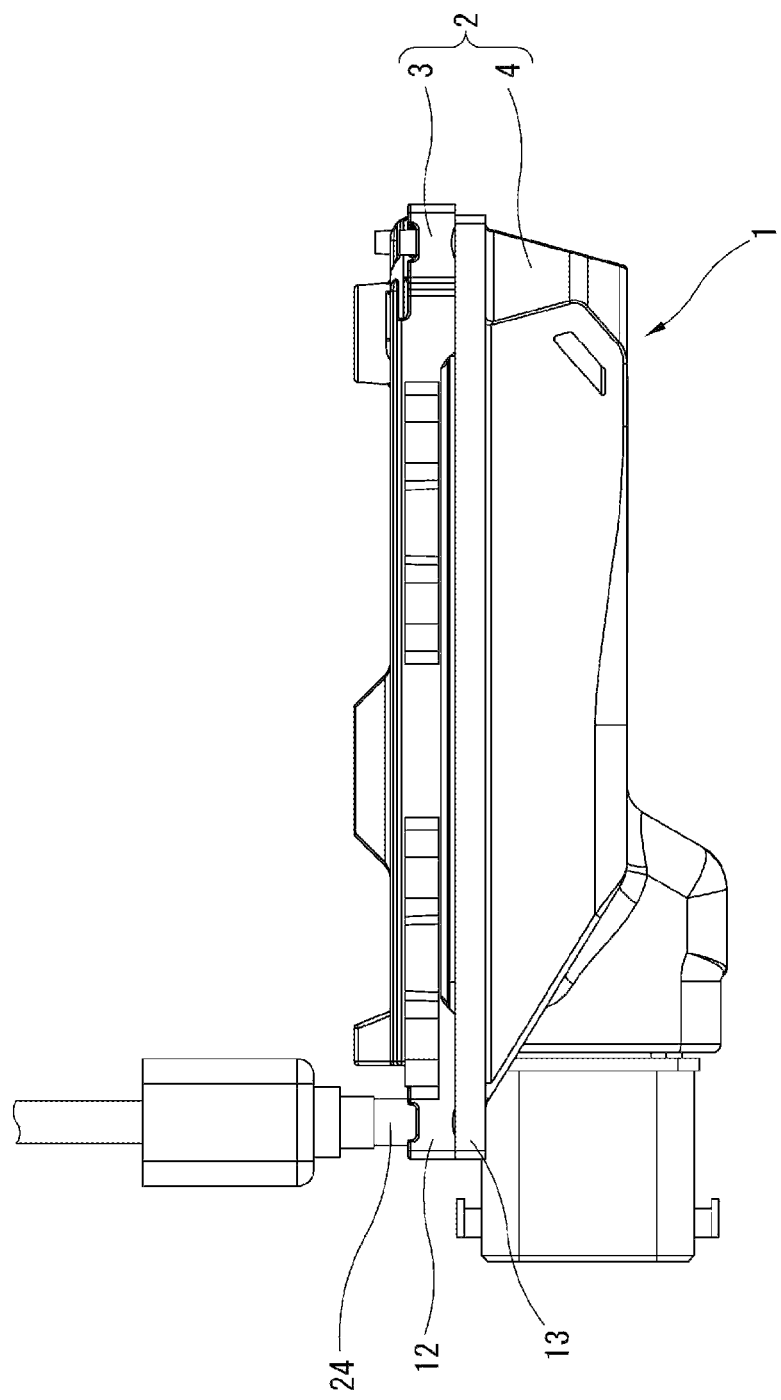
FIG. 5 is a side view showing the casing in a state in which the thermal caulking is being carried out by a welding tip.
Figure 6:
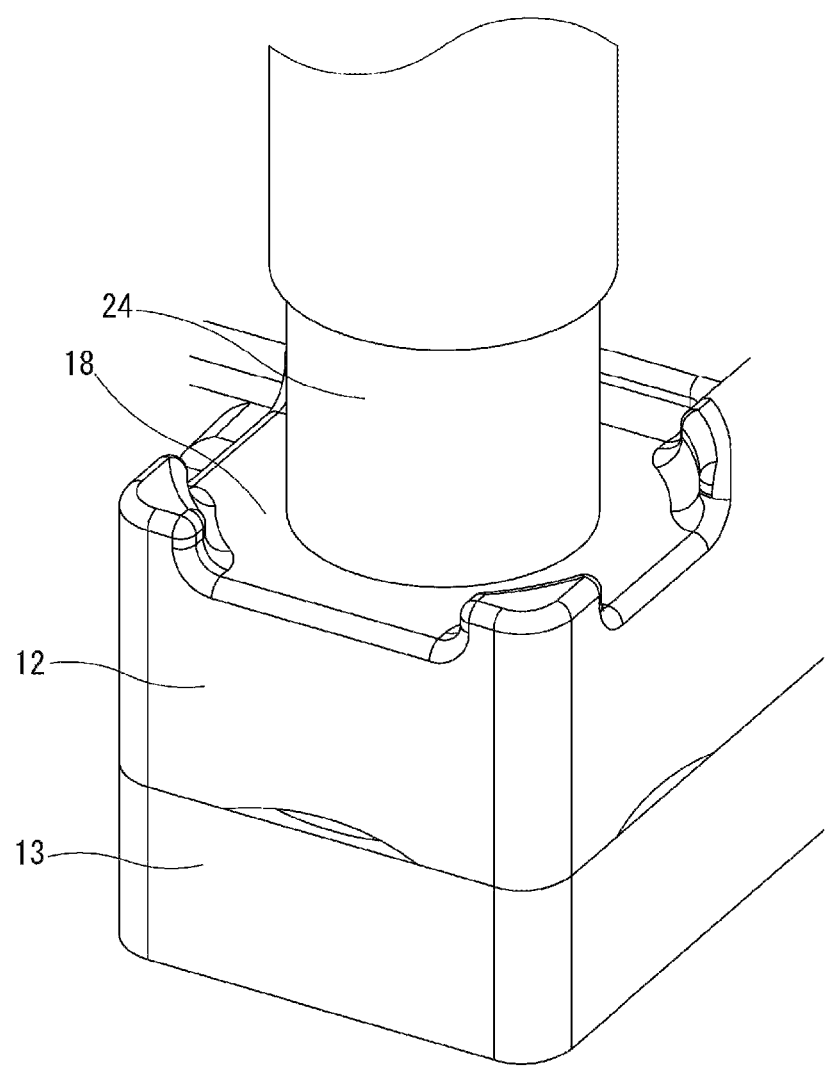
FIG. 6 is a side view showing an enlarged main part in the state in which the thermal caulking is being carried out.

In the thermal caulking process, as shown in FIG. 5 and FIG. 6, the distal end portion of the caulking pin 15 protruding from the mounting hole 21 as mentioned above is heated and pressed to form the mold firming portion 17 by using a bar-shaped welding tip 24 having a distal end surface in which a forming mold surface 23 (see FIG. 8) having a cup-shape corresponding to a desired shape of the mold forming portion 17 is recessed. As one specific example, the cover 4 is made of thermoplastic resin such as polybutylene terephthalate resin, and by being heated and pressed for approximately ten seconds with the electric heating type welding tip 24 heated at a temperature of approximately 300° C., the thermal caulking portion 11, namely, the mold forming portion 17 is formed. In addition, by using four welding tips 24 so as to correspond to thermal caulking portions 11 at four places, the thermal caulking portions 11 at four places are simultaneously formed.

Figure 11A:
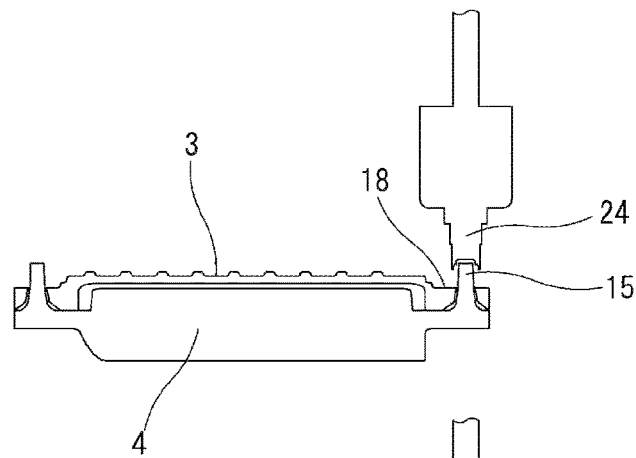
FIGS. 11A-11D are illustrative views showing the steps of the thermal caulking process.
Figure 11B:
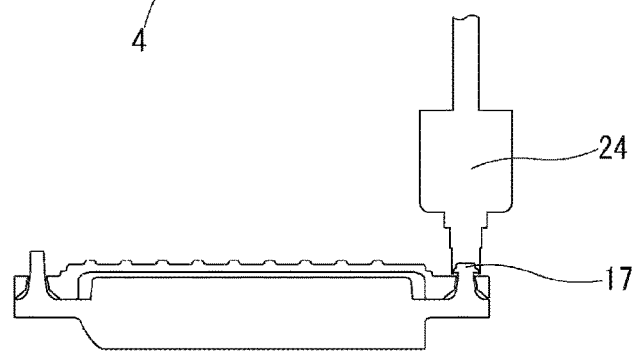
Figure 11C:
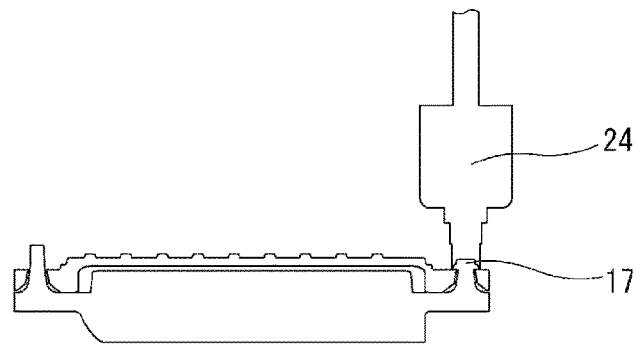
Figure 11D:
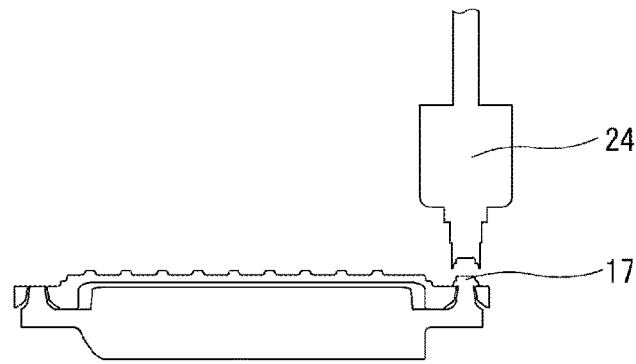

FIGS. 11A-11D are illustrative views of the steps of the thermal caulking process, and as shown in FIG. 11A, the welding tip 24 having, at the distal end thereof, the forming mold surface 23 is lowered toward the distal end of the caulking pin 15 along the axial direction, and then the distal end of the caulking pin 15 is heated and pressed. With this, as shown in FIG. 11B, the distal end of the caulking pin 15 is softened, and is gradually deformed along the forming mold surface 23. Then, as shown in FIG. 11C, the welding tip 24 becomes a state of coming in contact with the caulking receiving surface 18, and the formation of the mold forming portion 17 is finished. After that, in a state in which the resin material is cooled and solidified to a certain extent, as shown in FIG. 11D, the welding tip 24 is lifted upward. With this, the thermal caulking process is finished.

Here, in FIG. 11A, the material amount (that is, the amount of the resin material to be plasticized) of the distal end part of the caulking pin 15 positioned more on the upper side than the caulking receiving surface 18 is set so as to be slightly larger than the internal volume of the cup-shaped forming mold surface 23 of the welding tip 24. If the amount of the plasticized resin material was insufficient for the volume of the cup-shaped forming mold surface 23, the mold forming portion 17 that becomes the thermal caulking portion 11 would be formed with a lacking part, and a predetermined joining strength cannot be obtained.

Therefore, by setting the diameter and the length of the caulking pin 15 so as to generate a surplus resin material with respect to the volume of the forming mold surface 23, the forming of the lacking part in the mold forming portion 17 can be avoided. On the other hand, when the surplus resin material exists in this way, as mentioned above, a problem occurs that the plasticized surplus resin protrudes outward from between the distal end of the welding tip 24 and the caulking receiving surface 18, and it becomes burrs.

Figure 7:
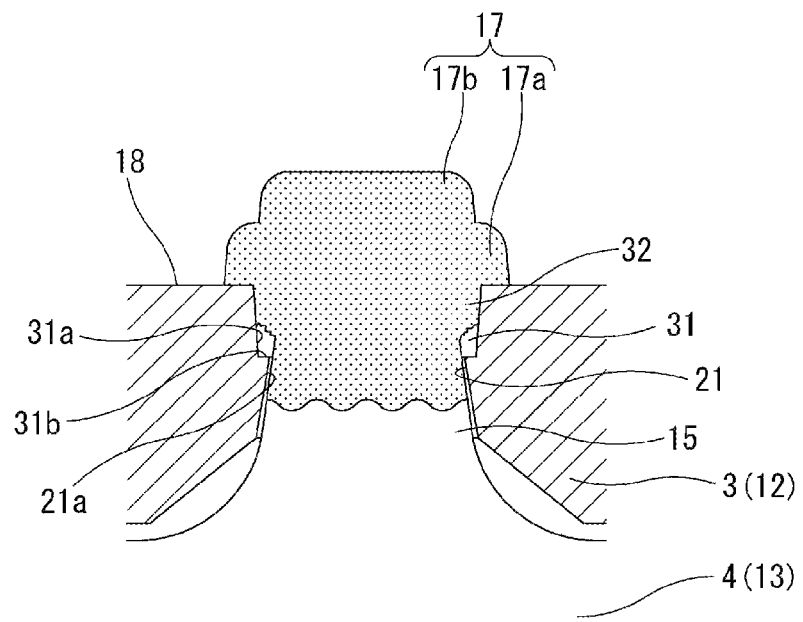
FIG. 7 is a sectional view taken along a line A-A of FIG. 2.
Figure 8:
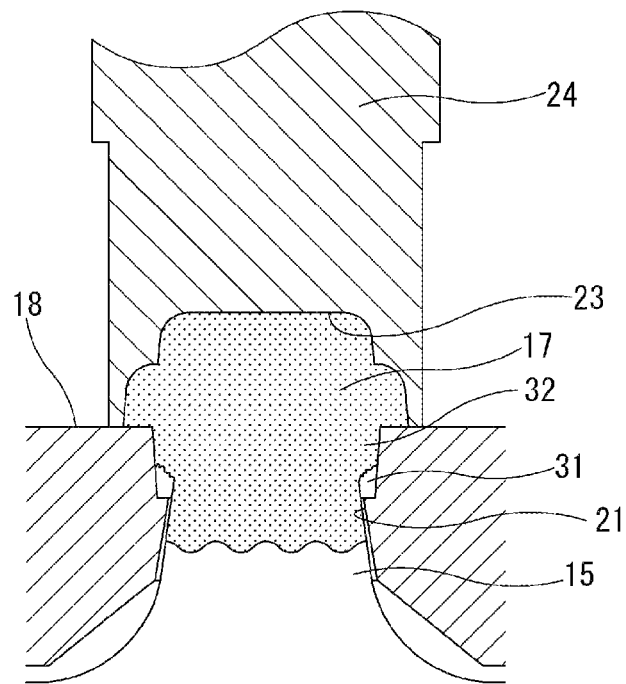
FIG. 8 is a sectional view showing a main part similar to FIG. 7, together with the welding tip.
Figure 9:
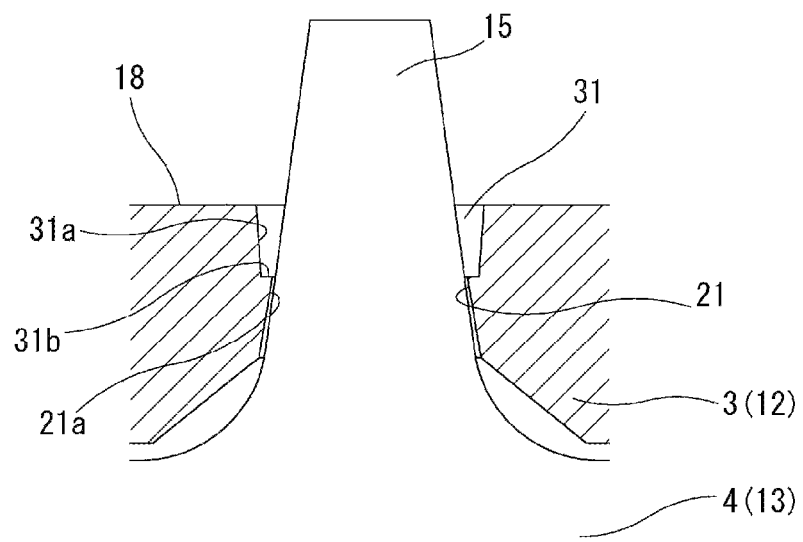
FIG. 9 is a sectional view taken along a line B-B of FIG. 4 before carrying out the thermal caulking process.

In the present embodiment, in order to suppress the occurrence of the forming of the burrs due to such surplus resin, as shown in FIG. 7 to FIG. 9, a surplus absorption recess 31 is formed at the periphery of the mounting hole 21 in the caulking receiving surface 18. FIG. 7 is a sectional view taken along a line A-A of FIG. 2, and molten surplus resin flows into the surplus absorption recess 31, and is solidified as a surplus resin portion 32 continued to the mold forming portion 17. FIG. 9 shows the surplus absorption recess 31 and the caulking pin 15 before carrying out the thermal caulking process.

The surplus absorption recess 31 in the first embodiment is formed by enlarging radially outward the opening end portion of the mounting hole 21 in the caulking receiving surface 18. In the end portion of the surplus absorption recess 31 in the axial direction of the caulking pin 15, the gap with the outer surface of the caulking pin 15 is narrowed so as to limit the flowing of molten resin. Specifically, an inner wall surface 31a on the outer peripheral side of the surplus absorption recess 31 extends along the center axial line of the caulking pin 15 (in other words, the center axial line of the mounting hole 21) so as to form a substantially cylindrical surface, and the end portion of the surplus absorption recess 31 is provided with a bottom surface 31b that becomes a step between the inner wall surface 31a of the surplus absorption recess 31 and the inner wall surface 21a of the mounting hole 21. The bottom surface 31b extends along the plane orthogonal to the center axial line of the caulking pin 15. Although the inner wall surface 31a may be a cylindrical surface parallel to the center axial line of the caulking pin 15, in the illustrated example, it is gently inclined as a draft angle at the time of the processing.

Figure 10:
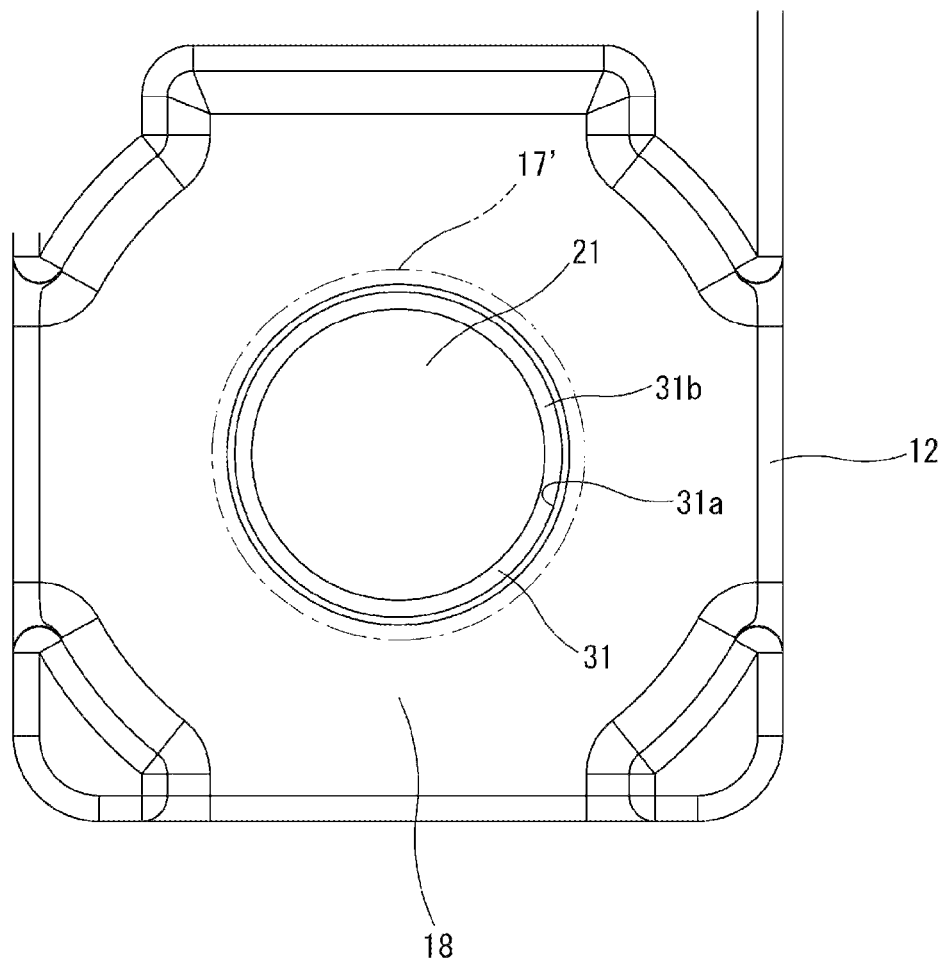
FIG. 10 is a plane view showing a mounting hole and a surplus absorption recess before carrying out the thermal caulking process.

That is, the surplus absorption recess 31 in the present embodiment is formed in an annular shape along the entire periphery of the mounting hole 21 as shown in FIG. 9 and FIG. 10, so as to have a volume capable of sufficiently absorbing the surplus resin between the caulking receiving surface 18 and the bottom surface 31b. Specifically, it is desirable to set the volume of the surplus absorption recess 31 to a volume having a slight margin for a surplus resin amount in design. In addition, the flow of the molten surplus resin entering into the surplus absorption recess 31 is stopped by the bottom surface 31b in the end, and there is therefore no possibility that a lacking part is formed to the mold forming portion 17 due to the lacking of the resin material for the mold forming portion 17.

In addition, the outer diameter of the surplus absorption recess 31 in the caulking receiving surface 18 is smaller than the diameter of the large diameter portion 17a of the mold forming portion 17. That is, in a state in which the mold forming portion 17 is formed by the thermal caulking process, the surplus absorption recess 31 exists inside a mold forming region 17' (see FIG. 10) of the mold forming portion 17. Therefore, the molten surplus resin is hardly pushed radially outward from the mold forming portion 17. The molten resin is pushed toward the caulking receiving surface 18 between FIG. 11B and FIG. 11C, and the surplus resin flows into the surplus absorption recess 31 in the inside of the forming mold surface 23 of the welding tip 24, and then is absorbed in the surplus absorption recess 31. In addition, in FIGS. 11A-11D, in order to simplify the drawing, the surplus absorption recess 31 and the mounting hole 21 are drawn without distinguishing therebetween.

Figure 13:
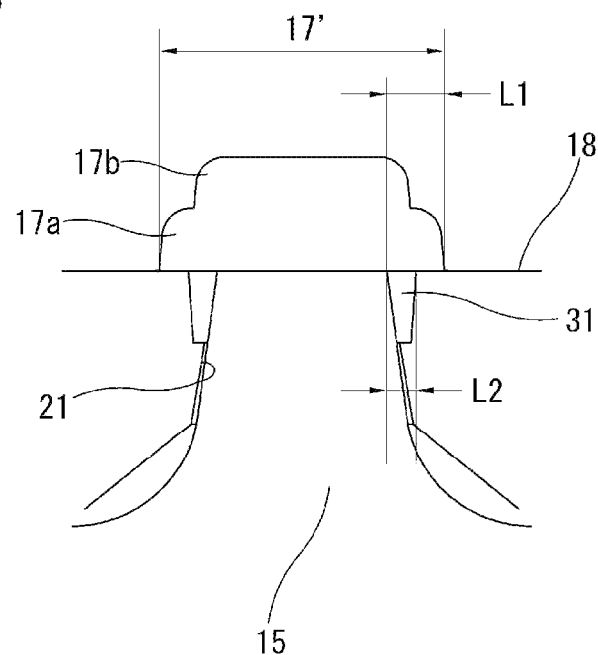
FIG. 13 is an illustrative view showing the dimensional relationship of a mold forming portion and the surplus absorption recess in a thermal caulking portion.

FIG. 13 is an illustrative view for explaining a preferable dimensional relationship between the mold forming portion 17 and the surplus absorption recess 31 in the caulking receiving surface 18. When the radial dimension of the mold forming portion 17 (large diameter portion 17a) is referred to as L1 and a radial dimension of the surplus absorption recess 31 is referred to as L2 based on the position of the outer peripheral surface of the caulking pin 15 in the caulking receiving surface 18, a preferable dimensional relationship is L1/2<L2<L1. By the relationship of L2<L1, the surplus absorption recess 31 is positioned inside the forming mold surface 23 of the welding tip 24, and thereby the surplus resin hardly adheres onto the distal end surface of the welding tip 24 annularly surrounding the forming mold surface 23. On the other hand, by the relationship of L1/2<L2, the opening of the surplus absorption recess 31 becomes sufficiently large, and the molten surplus resin surely flows into the surplus absorption recess 31 without flowing to the outside.

Therefore, according to the above embodiment, since the molten surplus resin material flows into the surplus absorption recess 31 inside the region 17' covered with the mold forming portion 17, and it becomes the surplus resin portion 32, the amount of resin material, as burrs, protruding outward from the mold forming portion 17 becomes small. Consequently, at the time of the thermal caulking process, the stain of the welding tip 24 is reduced.

Figure 12:
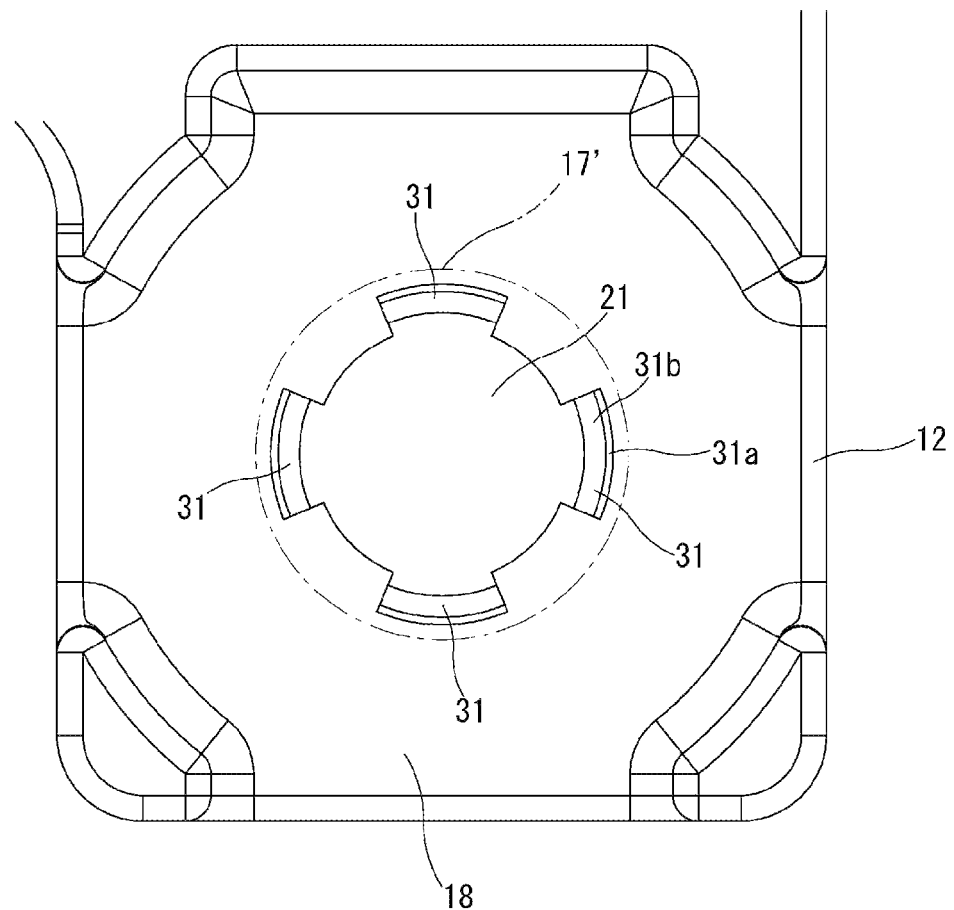
FIG. 12 is a plane view of a main part before carrying out the thermal caulking process in a second embodiment in which the surplus absorption recess is formed in a circular arc shape.

FIG. 12 shows a second embodiment of the surplus absorption recess 31. Similar to FIG. 10, FIG. 12 shows the surplus absorption recess 31 in a rectangular tab 12 before carrying out the thermal caulking process.

In the second embodiment, the surplus absorption recess 31 is not continuous on the entire periphery of the mounting hole 12, and is divided into four parts having arc shapes. In other words, the surplus absorption recess 31 is partially formed at each of four places on the periphery of the mounting hole 21. In this configuration, as the sum of the volumes of the four surplus absorption recesses 31, a volume capable of sufficiently absorbing the surplus resin is provided.

In addition, a configuration can also be applied in which the four surplus absorption recesses 31 are each formed in a substantially square shape, and arranged such that the whole of the four surplus absorption recesses 31 forms a substantially cross shape.

Figure 14:
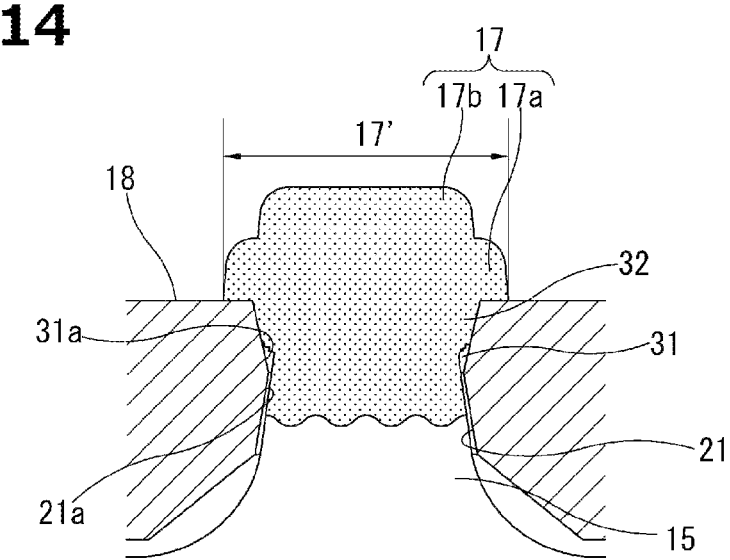
FIG. 14 is a sectional view of a main part in a third embodiment in which the inner wall surface of the surplus absorption recess is formed to be an inclined surface.

FIG. 14 shows a third embodiment of the surplus absorption recess 31. Similar to FIG. 7, FIG. 14 is a sectional view of a main part in a state in which the thermal caulking portion 11 is formed by the thermal caulking process.

In the third embodiment, the inner wall surface 31a on the outer peripheral side of the surplus absorption recess 31 is formed to be an inclined surface inclined in the direction in which the inner wall surface 31a is widen toward the caulking receiving surface 18 side with respect to the center axial line of the caulking pin 15 (in other words, the center axial line of the mounting hole 21). Then, in the end portion of the surplus absorption recess 31, the inner wall surface 31a on the outer peripheral side formed by the inclined surface is continued to the inner wall surface 21a of the mounting hole 21 without steps.

In addition, the surplus absorption recess 31 in the third embodiment may be configured so as to be annularly continued over the entire periphery of the mounting hole 21 as shown in the embodiment of FIG. 10, or may be configured so as to be divided into a plurality of parts having arc shapes as shown in the embodiment of FIG. 12.

Figure 15:
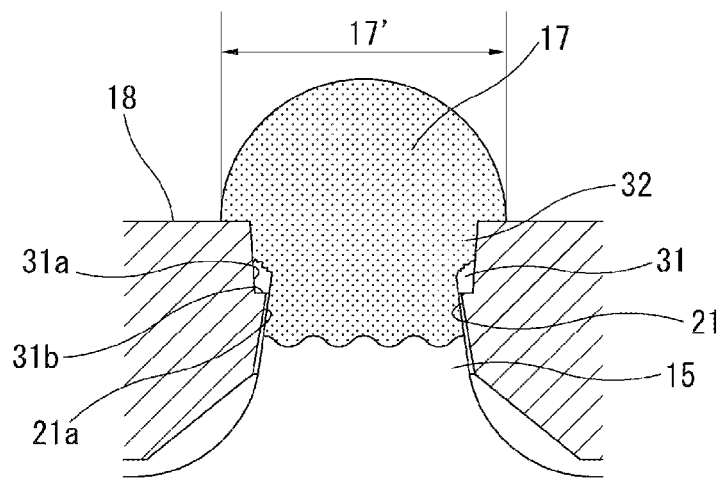
FIG. 15 is a sectional view of an main part in a fourth embodiment in which the mold forming portion is formed in a hemispherical shape.

Next, FIG. 15 shows a fourth embodiment in which the mold forming portion 17 of the thermal caulking portion 11 is formed to have a hemispherical shape. The configuration of the surplus absorption recess 31 is the same as that of the surplus absorption recess 31 in the first embodiment shown in FIG. 7 to FIG. 9. That is, the inner wall surface 31a on the outer peripheral side of the surplus absorption recess 31 extends along the center axial line of the caulking pin 15 (in other words, the center axial line of the mounting hole 21) so as to be a substantially cylindrical surface, and the end portion of the surplus absorption recess 31 is provided with a bottom surface 31b that becomes a step between the inner wall surface 31a of the surplus absorption recess 31 and the inner wall surface 21a of the mounting hole 21. The bottom surface 31b extends along the plane orthogonal to the center axial line of the caulking pin 15.

In addition, the surplus absorption recess 31 in the fourth embodiment may be configured so as to be annularly continued over the entire periphery of the mounting hole 21 as shown in the embodiment of FIG. 8, or may be configured so as to be divided into a plurality of parts having arc shapes as shown in the embodiment of FIG. 10.

Figure 16:
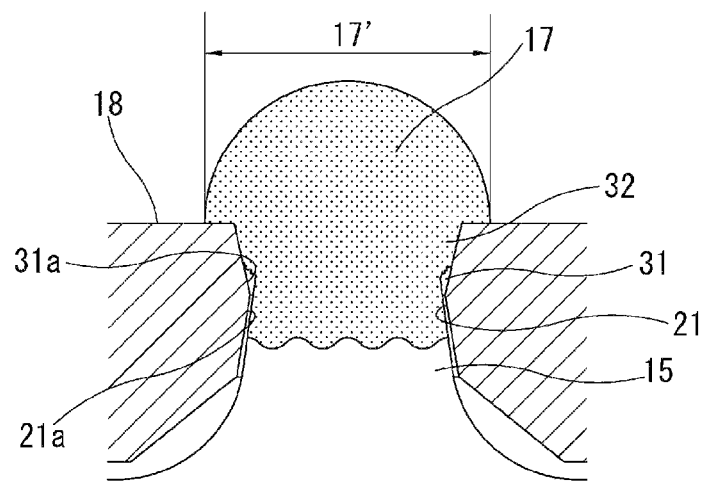
FIG. 16 is a sectional view of a main part in a fifth embodiment in which the mold forming portion is formed in a hemispherical shape and the inner wall surface of the surplus absorption recess is formed to be an inclined surface.

Next, FIG. 16 shows a fifth embodiment in which the mold forming portion 17 of the caulking portion 11 is formed in a hemispherical shape and the inner wall surface 31a on the outer peripheral side of the surplus absorption recess 31 is formed to be an inclined surface so as to be continued to the inner wall surface 21a of the mounting hole 21 without steps.

That is, the configuration of the surplus absorption recess 31 in the fifth embodiment is the same as that of the surplus absorption recess 31 in the third embodiment shown in FIG. 14.

In addition, the surplus absorption recess 31 in the fifth embodiment may be configured so as to be annularly continued over the entire periphery of the mounting hole 21 as shown in the embodiment of FIG. 10, or may be configured so as to be divided into a plurality of parts having arc shapes as shown in the embodiment of FIG. 12.

Figure 17:
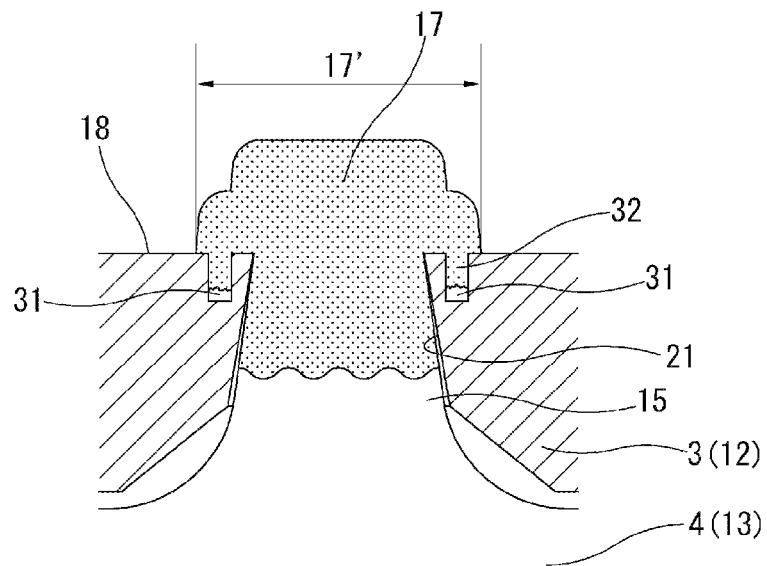
FIG. 17 is a sectional view of a main part in a sixth embodiment in which the surplus absorption recess is formed in an independent groove shape.

Next, FIG. 17 shows a sixth embodiment in which the surplus absorption recess 31 is formed independently from the mounting hole 21.

In the sixth embodiment, as a taper hole, the mounting hole 21 into which the caulking pin 15 is inserted is formed penetrating through the rectangular tab 12 on the case body 3 side. In the caulking receiving surface 18, the surplus absorption recess 31 is formed in a groove shape so as to surround the periphery of the opening of the mounting hole 21 and is formed independently from the mounting hole 21. The surplus absorption recess 31 is positioned inside the mold forming region 17' of the mold forming portion 17 that becomes the thermal caulking portion 11.

In such a configuration, the surplus resin molten in the thermal caulking process also flows into the surplus absorption recess 31 and solidified as the surplus resin portion 32. Consequently, it is possible to suppress the forming of burrs caused by the flowing out of the molten surplus resin from between the welding tip 24 and the caulking receiving surface 18.

In addition, similar to the embodiment of FIG. 12, the groove-shaped surplus absorption recess 31 formed independently from the mounting hole 21 can be formed by being divided into a plurality of circular arc parts.

Figure 18:
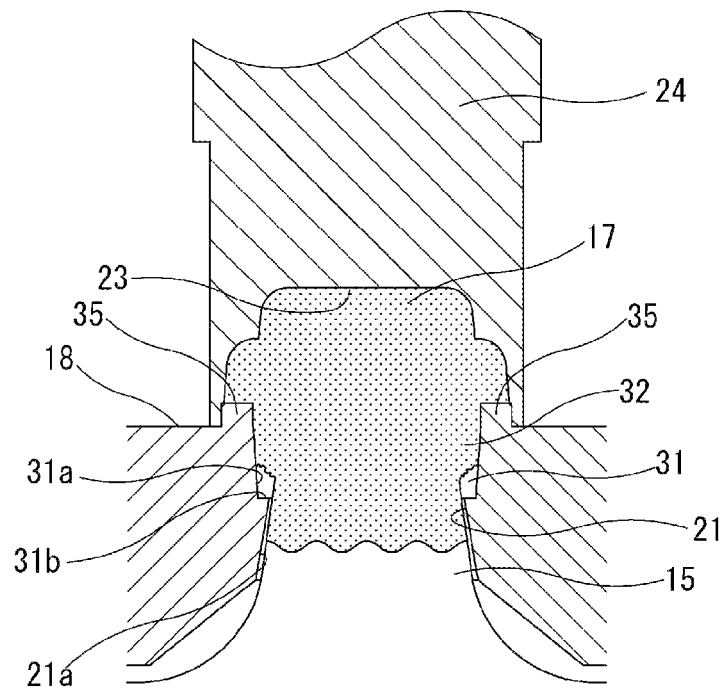
FIG. 18 is a sectional view of a main part in a seventh embodiment in which a protruding portion is formed on a caulking receiving surface.

Next, FIG. 18 shows a seventh embodiment in which the caulking receiving surface 18 is provided with an annular protruding portion 35. The protruding portion 35 has an outer diameter corresponding to the inner diameter of the forming mold surface 23 of the welding tip 24, so as to be fitted to the inner peripheral surface of the forming mold surface 23 with a minute gap therebetween when the welding tip 24 comes in contact with the caulking receiving surface 18. The surplus absorption recess 31 is formed along the inner periphery of the protruding portion 35. FIG. 18 is a sectional view in a state in which the mold forming portion 17 has already been formed by heating and pressing the caulking pin 15 by the welding tip 24.

In addition, as a configuration of the surplus absorption recess 31 itself, any of the embodiments mentioned above can be applied. For example, similar to the first embodiment shown in FIG. 7 to FIG. 9, the surplus absorption recess 31 is composed of the substantially cylindrical inner wall surface 31a and the bottom surface 31b of the end portion of the surplus absorption recess 31.

As the above, although embodiments of the present invention have been explained in detail, the present invention is not limited to the above embodiments, and various changes can be performed. For example, although, in the above embodiments, the caulking pin 15, the mounting hole 21 and the mold forming portion 17 each have a circular shape, a shape other than the circular shape can be applied. For example, a prism-shaped caulking pin 15 and a mold forming portion 17 having a different shape can be used. In addition, the above-mentioned synthetic resin material constituting the cover 4 and the above-mentioned temperature condition in the thermal caulking process are mere examples, and if the thermal caulking process can be carried out, any synthetic resin material and any temperature can be used. In addition, the present invention can be widely applied not only to the casing of the electronic device of the above embodiments, but also to a configuration in which two members are joined to each other by thermal caulking.

As the above, a thermal caulking joined body of the present invention includes: a first member including a synthetic resin caulking pin; and a second member including a mounting hole into which the caulking pin is inserted, wherein the thermal caulking joined body is formed by joining the members to each other in a manner that an end portion of the caulking pin passing through the mounting hole is molded to be a thermal caulking portion wider than the mounting hole, and wherein a surplus absorption recess into which molten surplus resin flows is provided in a caulking receiving surface on and with which the thermal caulking portion is spread and comes in contact, and is positioned inside a mold forming region of the thermal calking portion.

In one preferable aspect, the surplus absorption recess is formed by enlarging radially outward an opening end portion of the mounting hole in the caulking receiving surface, and, in an end portion of the surplus absorption recess in an axial direction of the caulking pin, a gap with an outer surface of the caulking pin is narrowed so as to limit flowing of molten resin.

In one specific example, an inner wall surface on an outer peripheral side of the surplus absorption recess extends along a center axial line of the caulking pin, and the surplus absorption recess is provided with, at the end portion thereof, a bottom surface that becomes a step between the inner wall surface of the surplus absorption recess and an inner wall surface of the mounting hole.

Alternatively, an inner wall surface on an outer peripheral side of the surplus absorption recess is formed to be an inclined surface inclined in a direction in which the inner wall surface is widen toward a caulking receiving surface side with respect to a center axial line of the caulking pin, and, in the end portion of the surplus absorption recess, the inclined surface is continued to an inner wall surface of the mounting hole.

In addition, in another preferable aspect, the surplus absorption recess is formed in a groove shape so as to surround a periphery of the mounting hole and is formed independently from the mounting hole, in the caulking receiving surface.

In addition, in one preferable aspect, the surplus absorption recess is partially formed at a plurality of each of places at a periphery of the mounting hole.

In one specific example, the first member is a cover provided with the caulking pin at a plurality of each of places of a periphery thereof, and the second member is a case body provided with the mounting hole at a plurality of each of places of a periphery thereof, and by joining the cover and the case body to each other, a casing of an electronic device having a circuit substrate accommodating space thereinside is formed.

The invention claimed is:

1. A thermal caulking joined body comprising:
   a first member including a synthetic resin caulking pin; and
   a second member including a mounting hole into which the caulking pin is inserted,
   wherein the thermal caulking joined body is formed by joining the members to each other in a manner that an end portion of the caulking pin passing through the mounting hole is molded to be a thermal caulking portion wider than the mounting hole, and
   wherein the second member includes a surplus absorption recess into which molten surplus resin flows, the surplus absorption recess provided in a caulking receiving surface on and with which the thermal caulking portion is spread and comes in contact, and positioned inside a mold forming region of the thermal caulking portion, and
   wherein the surplus absorption recess is provided with a bottom surface extending along a plane orthogonal to a center axial line of the caulking pin.

2. The thermal caulking joined body according to claim 1, wherein the surplus absorption recess is formed by enlarging radially outward an opening end portion of the mounting hole in the caulking receiving surface, and
   wherein, in an end portion of the surplus absorption recess in an axial direction of the caulking pin, a gap with an outer surface of the caulking pin is narrowed so as to limit flowing of molten resin.

3. The thermal caulking joined body according to claim 2, wherein an inner wall surface on an outer peripheral side of the surplus absorption recess extends along a center axial line of the caulking pin, and the surplus absorption recess is provided with, at the end portion thereof, a bottom surface that becomes a step between the inner wall surface of the surplus absorption recess and an inner wall surface of the mounting hole.

4. The thermal caulking joined body according to claim 2, wherein an inner wall surface on an outer peripheral side of the surplus absorption recess is formed to be an inclined surface inclined in a direction in which the inner wall surface is widened toward a caulking receiving surface side with respect to a center axial line of the caulking pin, and
   wherein, in the end portion of the surplus absorption recess, the inclined surface is continued to an inner wall surface of the mounting hole.

5. The thermal caulking joined body according to claim 1, wherein the surplus absorption recess is formed in a groove shape so as to surround a periphery of the mounting hole and is formed independently from the mounting hole, in the caulking receiving surface.

6. The thermal caulking joined body according to claim 1, wherein the surplus absorption recess is partially formed at a plurality of each of places at a periphery of the mounting hole.

7. The thermal caulking joined body according to claim 1, wherein the first member is a cover provided with the caulking pin at a plurality of each of places of a periphery thereof, and the second member is a case body provided with the mounting hole at a plurality of each of places of a periphery thereof, and by joining the cover and the case body to each other, a casing of an electronic device having a circuit substrate accommodating space thereinside is formed.

* * * * *